United States Patent [19]
Hampton

[11] 3,817,047
[45] June 18, 1974

[54] THERMAL JUNCTION FOR A CRYOGENIC VESSEL

[75] Inventor: Robert S. Hampton, Livermore, Calif.

[73] Assignee: Lox Equipment Company, Livermore, Calif.

[22] Filed: Dec. 7, 1971

[21] Appl. No.: 205,526

[52] U.S. Cl. .................... 62/45, 220/14, 285/192
[51] Int. Cl. ........................................ F17c 13/00
[58] Field of Search .......... 220/14; 285/DIG. 5, 47, 285/192; 62/45

[56] References Cited
UNITED STATES PATENTS

| 1,682,940 | 9/1928 | Smith | 285/47 X |
| 2,583,836 | 1/1952 | Gruetjen | 285/192 X |
| 3,352,444 | 11/1967 | Anderson | 220/14 |
| 3,538,714 | 11/1970 | Kling et al. | 62/54 |

Primary Examiner—Meyer Perlin
Assistant Examiner—Ronald C. Capossela
Attorney, Agent, or Firm—Joseph B. Gardner, Esq.

[57] ABSTRACT

A thermal junction for a cryogenic vessel to define a thermal resistance between a flow conduit and wall structure penetrated thereby. The temperature of the conduit may change significantly between flow and no-flow conditions, and the idealized objectives are that of maximizing heat flow between the conduit and wall structure at no-flow conditions and to minimize the heat flow therebetween at flow conditions. The thermal junction mechanism includes a support plate having an opening through which the flow conduit projects and along which the support plate and conduit are welded to each other to establish a good thermal path therebetween. The wall structure is provided with a large opening at the point of penetration thereof by the flow conduit, and such opening is substantially larger than the conduit so as to prevent contact therebetween. The support plate is secured to the wall structure in contiguous juxtaposition therewith by a plurality of hand-tightened fasteners that respectively extend through aligned apertures provided therefor in the plate and wall structure. At least one aperture in each of the aligned pairs thereof is substantially larger than the associated fastener so as to permit transverse displacements of the support plate relative to the wall structure so as to prevent stress development therebetween.

7 Claims, 4 Drawing Figures

PATENTED JUN 18 1974 3,817,047
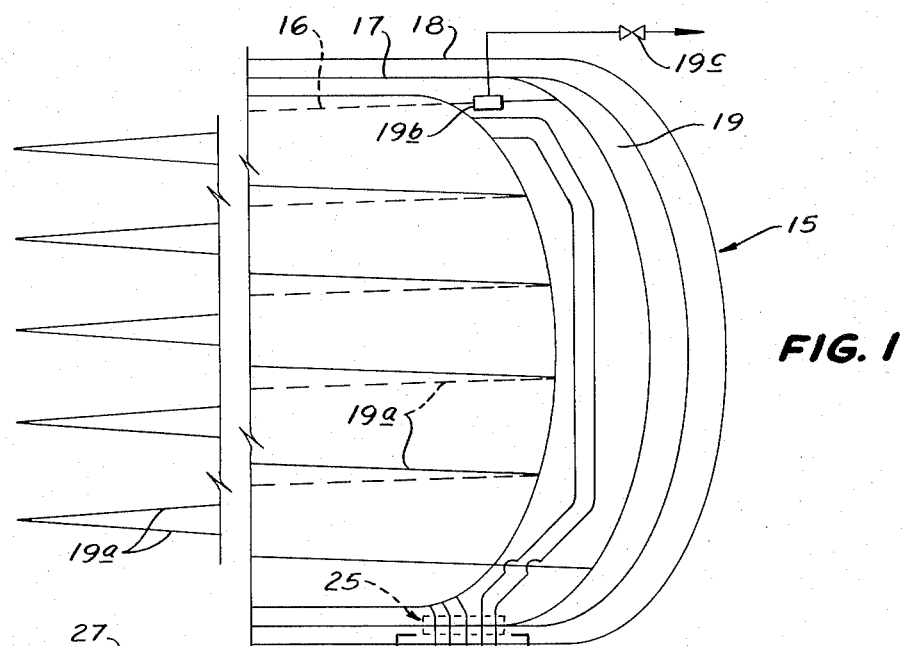
FIG. 1
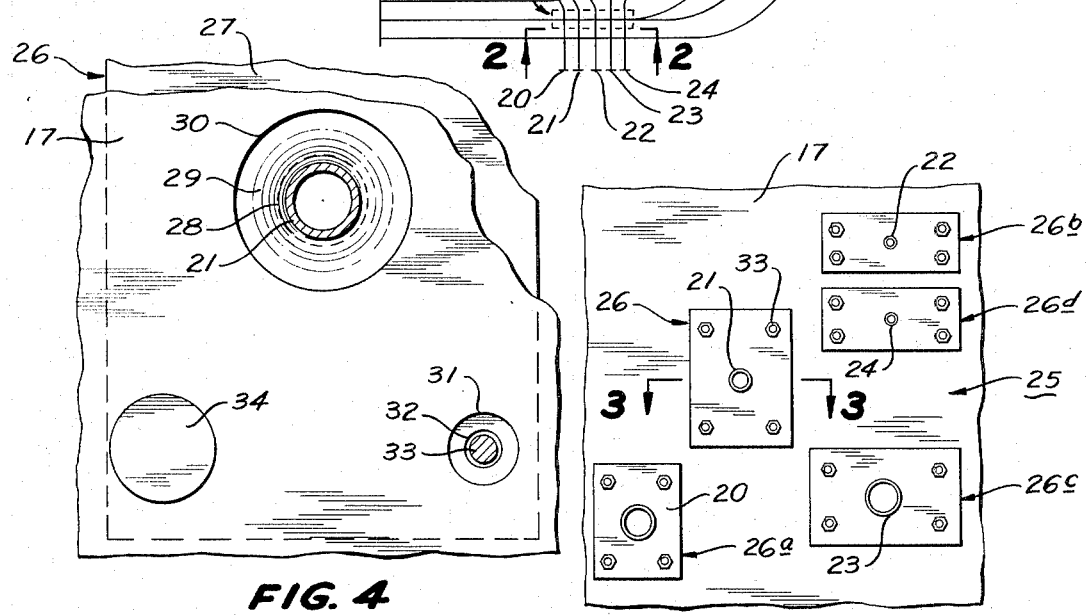
FIG. 4
FIG. 2
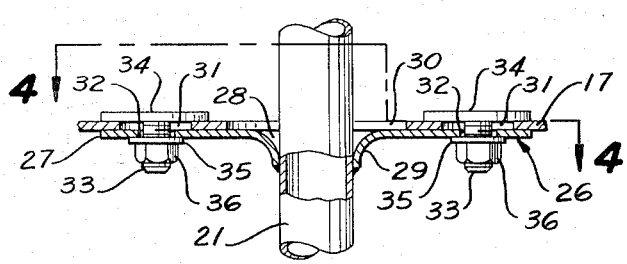
FIG. 3
INVENTOR:
ROBERT S. HAMPTON
BY Joseph B. Gardner
ATTORNEY

THERMAL JUNCTION FOR A CRYOGENIC VESSEL

This invention relates to cryogenic vessels and, more particularly, to a thermal junction mechanism to interconnect a flow conduit with a wall structure in a cryogenic vessel. A specific example of a vessel with which the invention has utility is a vessel for storing and transporting cryogenic fluids such as liquid helium.

Cryogenic fluids are advantageously stored and transported in their liquid phase or as a cold gas so that large quantities of any such fluid can be handled economically and have maximum refrigerative properties when used. Accordingly, special insulated vessels are required to preserve the low temperatures of the fluids, and such vessels are in the nature of large Dewar vessels providing an inner container for the fluid and an outer insulating shell or jacket enclosing the same. Considering helium as an example of a cryogenic fluid that may be stored and transported in a vessel with which the invention has utility, the critical temperature of this element is slightly below −450°F and the critical pressure approximates 2.26 atmospheres. It will be evident that the tremendous temperature differential between the inner fluid-receiving container and the ambient temperature assumed by the outer shell requires minimizing the paths of heat migration from the outer shell to the inner container and fluid confined therewithin.

Such temperature differentials and the requirement that the inner container be structurally supported by the outer container usually imply that refrigeration techniques be employed to maintain the requisite low temperatures at the inner container, even where specialized support structures and modern insulating techniques are used to interrelate the outer shell and inner container. For example, liquid nitrogen, which has a much higher freezing or solidification temperature than helium, may be used to cool liquid helium. A specific example of a cryogenic storage vessel of this type is disclosed in the copending patent application of Robert S. Hampton, et al., Ser. No. 42,052, filed June 1, 1970, which is assigned in common with the present application to the same assignee. The vessel disclosed in such copending patent application includes a plurality of axially elongated containers disposed one within another in substantially concentric relation. The innermost container is adapted to receive helium therewithin, the second container enclosing the same is an intermediate heat shield container, and the outer container is a shell or jacket enclosing the intermediate heat shield. A flow conduit for liquid nitrogen is coiled about the intermediate heat shield so as to form therewith a bearer preventing inward migration of heat from the outer container to the inner container and liquid helium confined therewithin.

It will be apparent that any flow conduits connecting the inner helium-confining container with the exterior of the vessel must penetrate or extend through the intermediate heat shield and, therefore, they necessarily define a heat leak path by means of which ambient heat can be conducted inwardly to the inner container and fluid confined therewithin. The extent or magnitude of such inward migration of heat can be reduced by welding or otherwise establishing an equally effective mechanical interconnection between each flow conduit and the intermediate heat shield so as to minimize thermal resistance therebetween, thereby causing the heat shield to receive most of the inwardly migrating heat so as to prevent the same from reaching the inner fluid-confining container. Although this arrangement would be advantageous at no-flow conditions in the conduits, it is not advantageous at flow conditions because any such minimal-resistance thermal junction between a flow conduit and heat shield would establish an undesirable thermal path to the liquid during flow conditions so as to elevate the temperature of the helium flowing through any such conduit and to excessively reduce the temperature of the heat shield at least in the general vicinity of the flow conduit and risk solidification of the nitrogen coolant which would then interfere with the effectiveness thereof. Further, a rigid interconnection of each flow conduit and intermdiate heat shield causes stress development therebetween which, evidently, is undesirable.

Objects, among others, of the present invention are to provide a thermal junction mechanism effective to practicably maximize thermal conductivity between a flow conduit and wall structure at no-flow conditions, and also practicably minimize thermal conductivity therebetween at flow conditions; to provide a thermal junction mechanism of the type described which also accommodates relative displacements between the flow conduit and wall structure so as to prevent undue stress development therebetween; and to provide a thermal junction mechanism of the type set forth which is adapted for use with the heat shield container of a tripartite cryogenic storage vessel of the character set forth, and which mechanism includes a support plate connected with the flow conduit as by welding to define a minimal-resistance thermal flow path therebetween and connected to the wall structure by hand-tightened fasteners so as to movably confine the same in contiguous juxtaposition, the wall structure having a large opening passing the flow conduit therethrough with sufficient clearance to prevent contact therebetween.

Additional objects and advantages of the invention, especially as concerns particular features and characteristics therof, will become apparent as the specification continues.

An embodiment of the invention is illustrated in the accompanying drawing, in which:

FIG. 1 is a broken diagrammatic view of an end portion of a multiple-container cryogenic storage vessel embodying the invention;

FIG. 2 is an enlarged, broken longitudinal sectional view of a portion of the vessel, the view being taken generally along the line 2—2 of FIG. 1;

FIG. 3 is a further enlarged, broken longitudinal sectional view taken along the line 3—3 of FIG. 2; and FIG. 4 is a broken longitudinal sectional view taken along the line 4—4 of FIG. 3.

The particular storage vessel illustrates diagrammatically in FIG. 1 is disclosed in detail in the aforementioned patent application, Ser. No. 42,052, to which reference may be made for any such details, and insofar as they may be necessary to an understanding of the present invention they are incorporated herein by this reference to such application. The vessel, which is designated in its entirety with the numeral 15, is intended for use with cryogenic fluids that are necessarily stored and transported at very low temperatures in an effort to maintain the fluid in its liquid phase. By way of example, one of the cryogenic fluids commonly stored and transported is helium and the critical temperature-pressure values thereof are −450.328°F. and 2.26 atmospheres. Therefore, as heretofore stated, if helium is being stored within the vessel 15, it is desirable to maintain the temperature-pressure conditions at or below the critical values for this fluids so that the liquid phase thereof can be preserved.

It is very difficult to maintain these values, however, and often the cryogenic fluid will become a two-phase system and finally change into the gaseous phase. Refrigeration techniques are usually employed to maintain the requisite low temperatures and, further, when change to the gaseous phase occurs in the vessel 15, a very substantial quantity (as much as 70 percent or more) of liquid helium can be reclaimed by depressurizing the vessel by venting the same through its gas phase line which cools the remaining helium, thereby causing the same to revert to its liquid phase. Nevertheless, it is necessary to minimize to negligible amounts any heat migration between the cryogenic fluid and the ambient environment in which it must be stored and transported.

The vessel 15 may be used either for stationary storage or for mobile storage or transport, and although the size and capacity of any particular vessel may vary considerably, by way of indicating a general order of magnitude of typical vessels, the over-all length of one wheel-equipped vessel intended to support approximately 10,500 gallons of liquid helium is about 40 feet and the outer diameter thereof is about 8.0 feet. The vessel 15 includes a plurality of axially elongated containers disposed one within another in substantially concentric relation. Such plurality of containers includes a first or inner storage container 16, a second or intermediate heat shield container 17, and a third container or outer jacket or shell 18 enclosing the intermediate heat shield 17 and, therefore, the first or inner storage container 16 which is adapted to receive and store the cryogenic fluid therewithin.

The containers are supported with respect to each other by means of specialized support structure having sufficient strength to accommodate the relatively high static and dynamic loadings impose thereon, also having sufficient flexiblity to accommodate any necessary relative movement between the containers such as those movements resulting from differential thermal expansion and contraction, and at the same time having restricted thermal paths to minimize heat migration inwardly from the outer jacket 18 to the fluid confined within the inner container 16. Such support structure is not shown since it forms no part of the present invention and it is disclosed in the aforementioned copending patent application, Ser. No. 42,052. Similarly, the intermediate heat shield container 17 is provided adjacent one end thereof with a pair of spaced apart bulkheads defining a chamber or reservoir 19 adapted to receive a coolant such as liquid nitrogen which is circulated about the intermediate heat shield through a flow conduit 19a in heat exchange relation therewith so as to extract heat therefrom. Liquid coolant is returned to the reservoir 19 through a trap 19b, and gaseous coolant is vented through a pressure relief valve 19c. The details of this cooling system are excluded from the present disclosure and are found in the aforementioned patent application to which reference may be made therefor.

A rather complex filling, discharge, gauge and vent system is provided for the vessel 15, and for the most part the flow conduits comprised thereby necessarily communicate with the interior of the inner container 16, and they extend outwardly therefrom through the intermediate heat shield 17 and outer jacket 18. A number of such conduits are indicated diagrammatically in FIG. 1, and they include a fill and drain pipe 20 for liquid helium, a liquid helium-to-pressure conduit 21, a high pressure gauge conduit 22, a top vent 23 for helium gas, and a low pressure gauge line or conduit 24. Each of these conduits communicates with the interior of the inner container 16 and extends outwardly through the intermediate heat shield 17 and outer jacket 18 as indicated, and therefore provides an unwanted heat-leak path by emans of which ambient heat can migrate inwardly to the inner container 16 to elevate the temperature of the helium stored therewithin.

Two somewhat opposite or incompatible conditions are desired, however, as respects the thermal relationship of the conduits 20 through 24 with the intermediate heat shield 17 which has for its function thermal isolation of the inner container 16 from the outer jacket 18. In this respect, when there is no flow of the very low temperature helium through the conduits therefor and especially through the fill and drain conduit 20, it is desirable to maximize the thermal conductivity between the various conduit 20–24 and the heat shield 17 so that ambient heat conducted inwardly from the jacket 18 by the various conduits is transmitted directly and entirely, insofar as practicable, to the heat shield 17 so that such ambient heat is not conducted inwardly to the helium storage container 16.

On the other hand, when the low temperature helium is flowing through one or more of the conduits, it is desirable to minimize thermal conductivity between such conduit or conduits and the heat shield 17 so that heat present in the latter is not transferred to the helium to heat the same and possibly cause some expansion thereof into gas, and so that the heat shield 17 is not excessively cooled to the point that the nitrogen coolant circulating about the shield through the conduit 19a solidifies, at least at localized areas, which would interfere with and impede the cooling process to be performed thereby. Therefore at no-flow conditions, a thermal junction having excellent thermal conductivity is most advantageous between the flow conduits and intermediate heat shield, but at helium-flow conditions a thermal junction providing a temperature barrier is most advantageous between the flow conduits and intermediate heat shield.

Thermal junction mechanism providing optimum thermal conductivity at both no-flow and helium-flow conditions is shown in FIGS. 2 through 4 and is provided in association wit the intermediate container or heat shield 17, as indicated by the area enclosed with broken lines in FIG. 1 and denoted generally with the numeral 25. In more particular terms, and as illustrated best in FIG. 2, the composite thermal junction mechanism 25 comprises a plurality of individual thermal junction mechanisms respectively associated with the conduits 20 through 24. In each instance, however, the individual thermal junction mechanism are essentially the same and for this reason the numeral 26 is used to identify each, the suffixes "a" through "d" being used where appropriate for purposes of differentiation. Accordingly, the subsequent detailed description of the mechanism 26 associated with the conduit 21 will be understood to apply equally to the other mechanisms 26a through 26d.

The mechanism 26 includes a support plate 27 having an opening 28 passing the conduit 21 therethrough. The conduit 21 is connected mechanically with the plate 27 so as to structurally interrelate the same and define a thermal flow path therebetween. In this respect, the plate 27 adjacent the opening 28 is equipped with an arcuate neck 29 converging toward the conduit and extending axially therealong outwardly from the heat shield 17, as shown most clearly in FIG. 3. The converging neck 29 defines the opening 28, and it is welded to the conduit 21 to establish the aforementioned mechanical interconnection therebetween. The plate 27 may have a generally rectangular configuration, as shown in FIG. 2, and as a specific example, it may be a 20 gauge stainless steel plate having a length of approximately 5 ¾ inches and a width of approximately 3 ¼ inchs, the conduit 21 in such case being stainless steel and having an outer diameter approximating ½ inch.

It will be apparent that the heat shield 17 must have an opening therein through which the conduit 21 extends, and as shown in FIG. 3, an opening 30 is provided which has a substantially greater diameter than that of the conduit 21 so as to freely pass the same therethrough without contact therewith. The heat shield 17 is also provided with a plurality of spaced apart apertures 31 used to attach the plate 27 thereto, and in the particular structural assemblage being considered, four such apertures 31 are provided by the shield 17. The support plate 27 is also provided with a plurality of apertures 32 respectively aligned with the apertures 31 so as to pass fasteners therethrough by means of which the plate 27 is secured to the heat shield 17.

Each fastener associated with the paired apertures 31, 32 includes a threaded shank 33 equipped at one end with an enlarged head 34 and at its opposite end it is adapted to receive a washer 35 and nut 36. It will be apparent that each fastener is essentially in the form of a nut and bolt assembly, and the head 34 of each such fastener must be sufficiently large to cover the associated aperture 31 since it is engageable with the heat shield 17 along the inner surface thereof. Similarly, the washer 35 must be sufficiently large to cover the associated opening 32 since it bears against the outer surface of the support plate 27. Each of the apertures 31 and 32 must be large enough to pass the shank 33 of the associated fastener therethrough, and at least one aperture in each pair thereof is substantially larger than the shank 33 of the fastener so as to enable the wall structure of the temperature barrier 17 and support plate 27 to move translationally relative to each other within the dimensional limits established by the larger aperture. As seen most clearly in FIG. 3, the aperture 31 provided by the heat shield 17 is made substantially larger than the aperture 32. The particular mechanism 26 being considered has four pairs of apertures 31, 32 and four fastener structures respectively associated therewith.

To assemble the various thermal junction mechanisms 26 with the heat shield 17 after the wall structure of the heat shield has been prepared with the necessary openings 30 and apertures 31 in the plate 27 has been similarly prepared, the conduit 21 is inserted through the opening 28 of the support plate, the paired apertures 31 and 32 are aligned, and the various fasteners are hand tightened to draw the plate 27 into firm frictional engagement with the contiguous surface of the heat shield 17. Thereafter, the conduit 21 is welded to the support plate 27 at the outer terminal end of the neck 29, as shown in FIG. 3. This assembly sequence enables the conduit 21 to move relative to the support plate 27 so as to assume an unstressed positional relationship with respect thereto prior to being rigidly secured by the weld joint therebetween. No further tightening of the fastener is required.

Such interconnection of the support plate 27 and conduit 21 with the adjacent wall structure of the heat shield 17 accommodates relative movement between the conduit and heat shield, thereby obviating stress development therebetween. Additionally, and as previously indicated, each thermal junction mechanism 26 defining the interconnection of the associated flow conduit with the heat shield minimizes heat loss to the inner storage container 16 and helium confined therewithin at no-flow conditions by defining a modest or relatively small resistance to heat transfer from the flow conduit to the heat shield at no-flow conditions. During helium flow conditions, each thermal junction mechanism 26 defines appreciable resistance to heat flow between the associated conduit and heat shield 17 which prevents excess cooling of the liquid nitrogen and consequent heating of the liquid helium.

In illustrative numerical terms, a thermal junction mechanism of the type described in association with a flow line having an outer diameter approximating one inch has been found to have under no-flow conditions a temperature at the support plate 27 of $-263°F$ when the temperature of the shield 17 is $-320°F$ and the temperature of the inner container 16 is $-452°F$. This temperature relationship under no-flow conditons results in a heat loss to the inner container 16 via the flow conduit and thermal junction mechanism of approximately 0.13 BTU's per hour, which is relatively minor. By comparison, the heat loss to the inner container 16 under the same temperature parameters for the heat shield 17 and inner container 16 approximately 0.38 BTU's per hour when the conduit is not attached to the heat shield by means of the thermal junction structure, thereby resulting in a significant increase of approximately 300 per cent. Under flow conditions, the aforementioned temperature values for the inner container 16, heat shield 17, and support plate 27 resulted in a heat loss to the liquid helium flowing through the conduit of approximately 7.8 BTU's per hour which is a very insignificant amount of loss.

Under no-flow conditions, the amount of heat flow inwardly toward the inner container 16 through any conduit by conduction is relatively small so that the temperature difference between such conduit together with the plate 27 attached thereto and the heat shield 17 is correspondingly small. Accordingly, the relatively low thermal resistance defined between the contiguous surface areas of the plates 27 and heat shield 17 which are held in engagement only by the hand-tightened fasteners permits most of the heat carried inwardly by the respectively associated conduits to be absorbed by the heat shield 17 through such thermal resistance, thereby preventing significant heat migration to the inner container 16 (i.e., limiting such inward heat migration to a value of 0.13 BTU's per hour in accordance with the foregoing example). At helium-flow conditions, the difference between the heat shield 17 and particular conduit having the flow therethrough is substantial (the diference between −450°F and −320°F in accordance with the prior example, assuming the flow conduit temperature to be substantially the same as that of the inner container 16). Accordingly, heat conduction through the thermal resistance from the heat shield 17 to the flow conduit will be greater than at no-flow conditions, but nevertheless insigificant in relative terms (i.e., approximately 7.8 BTU's per hour in the aforementioned specific example).

It will be appreciated that the described heat leaks across the various mechanisms 26 can be changed by altering the characteristics of such mechanisms. For example, the plates 27 can be made to have greater thermal conductions either by selecting a material other than stainless steel or by increasing the thickness of the plates each of which will increase the rate of heat transfer across the mechanisms. While any such increase is advantageous at no-flow conditions, as previously explained, it is disadvantageous at helium-flow conditions. AS an example, in one such situation increasing the thickness of a plate 27 so that the inward heat loss through the associated flow conduit to the inner helium-confining container 16 was reduced from approximately 0.1345 BTU's per hour to 0.1080 BTU's per hour at no-flow conditions, a decrease approximating 24 per cent, at helium-flow conditions the heat loss from the shield 17 to the liquid helium increased from approximately 7.86 BTU's per hour to approximately 132.0 BTU's per hour, an increase of 1,680 per cent. Of course, the thermal conductance of each mechanism 26 can be descreased as, for example, by reducing the thickness of the plates 27 which will beneficially reduce the heat loss to the liquid helium at flow conditions but will detrimentally increase the heat loss to the inner container 16 at no-flow conditions.

As previously indicated, the thermal junction mechanisms 26 establish the desirable thermal resistances necessary to optimumly confine heat losses to the liquid helium both at no-flow and flow conditions and, at the same time, accommodate relative movements between each of the flow conduits 20 through 24 and the heat shield container 17 so as to obviate or materially reduce stress concentrations that otherwise are prone to develop because of changes in the dynamic and static loadings of the vessel 15 and thermal expansions and contractions that accompany relative temperature changes.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In a cryogenic vessel having a plurality of containers supported one within another in spaced apart relation, one of said containers being an inner cryogenic fluid-storage container adapted to store helium therein, another being an outer jacket enclosing all of said containers, and still another being an intermediate heat shield enclosing the inner container and having a coolant conduit disposed in heat exchange relation therewith and adapted to receive nitrogen coolant to serve as a cooling medium for said intermediate heat shield, a flow conduit connected in flow communication with said inner container and extending through both said intermediate heqt shield and outer jacket and defining a flow path for such cryogenic fluid whereby a significant temperature gradient is defined at certain times between said flow conduit and intermediate heat shield, and thermal junction mechanism mechanically interconnecting said intermediate heat shield and flow conduit to support one with respect to the other and establish a thermal resistance therebetween, said mechanism comprising: a support plate of relatively good thermal conductivity having an opening passing said flow conduit therethrough and being mechanically connected therewith to interrelate the plate and flow conduit structurally and define a relatively good thermal flow path therebetween; said intermediate heat shield having an opening therein of substantially greater cross section than that of said flow conduit and freely passing the same therethrough in spaced relation with the edges thereof; said support plate and intermediate heat shield being provided with a plurality of aligned pairs of aperture adapted to pass fasteners therethrough; and a plurality of fasteners respectively extending through said paired apertures and mechanically securing said support plate snugly to said intermediate heat shield in direct contiguous relation therewith to establish a thermal flow path therebetween; said thermal junction mechanism providing optimum thermal conductivity between said flow conduit and intermediate heat shield at both a no-flow condition through said flow conduit at which maximum thermal conductivity is desired to limit inward migration of heat to said inner container and a fluid flow condition at which minimum thermal conductivity is desired to limit over cooling of said intermediate heat shield and the coolant in heat exchange relation therewith.

2. The combination of claim 1 in which each of said fasteners comprises a nut-equipped bolt hand-tightened to effect snug abutment of said support plate with said intermediate heat shield.

3. The combination of claim 1 in which at least one aperture in each of said pairs thereof is substantially larger than the associated fastener extending therethrough to enable said intermediate heat shield and plate to move translationally relative to each other within the dimensional limits of such larger apertures.

4. The combination of claim 1 in which said intermediate heat shield and support plate are metalic components with the latter having a large uninterrupted surface area in direct contact with the former circumjacent the aforesaid opening therethrough.

5. The combination of claim 1 in which said support plate is provided with an arcuate neck converging toward said flow conduit and defining the opening in said plate through which said flow conduit passes, said flow conduit being welded to said support plate along said neck to effect a relatively good thermal flow path therebetween.

6. The combination of claim 5 in which each of said fasteners comprises a nut-equipped bolt hand-tightened to effect snug abutment of said support plate with said intermediate heat shield.

7. The combination of claim 6 in which at least one aperture in each of said pairs thereof is substantially larger than the associated fastener extending therethrough to enable said intermediate heat shield and plate to move translationally relative to each other within the dimensional limits of such larger apertures.

* * * * *